US012291824B2

(12) United States Patent
Bourdage

(10) Patent No.: US 12,291,824 B2
(45) Date of Patent: May 6, 2025

(54) CONCRETE REMOVAL DEVICE AND SYSTEM

(71) Applicant: Noah Bourdage, Crosby, MN (US)

(72) Inventor: Noah Bourdage, Crosby, MN (US)

( * ) Notice: Subject to any disclaimer, the term of this patent is extended or adjusted under 35 U.S.C. 154(b) by 0 days.

(21) Appl. No.: 18/237,198

(22) Filed: Aug. 23, 2023

(65) Prior Publication Data

US 2024/0068180 A1 Feb. 29, 2024

Related U.S. Application Data

(60) Provisional application No. 63/401,815, filed on Aug. 29, 2022.

(51) Int. Cl.
*E01C 23/05* (2006.01)
*B66F 9/075* (2006.01)
*B66F 9/18* (2006.01)

(52) U.S. Cl.
CPC .......... *E01C 23/05* (2013.01); *B66F 9/07504* (2013.01); *B66F 9/18* (2013.01)

(58) Field of Classification Search
CPC ....... E01C 23/05; E04G 21/167; E04G 21/16; E04G 21/142; B66F 9/07054; B66F 9/18; B66C 1/66
See application file for complete search history.

(56) References Cited

U.S. PATENT DOCUMENTS

| | | | | | |
|---|---|---|---|---|---|
| 2,819,872 | A * | 1/1958 | Janzer | E01C 23/05 | 301/1 |
| 2,865,523 | A * | 12/1958 | Morrison | E01C 23/05 | 414/733 |
| 3,290,005 | A * | 12/1966 | Beemsterboer | E01C 23/05 | 180/217 |
| 4,802,813 | A * | 2/1989 | Perry | E04G 21/167 | 294/131 |
| 5,497,569 | A * | 3/1996 | Byman | E02F 3/815 | 172/612 |
| 6,752,566 | B2 * | 6/2004 | Smith | E01C 23/06 | 404/75 |
| 10,227,218 | B1 * | 3/2019 | Stone | E04G 21/147 | |
| 10,412,854 | B1 * | 9/2019 | Shaul | H05K 7/1495 | |
| 2024/0359923 | A1 * | 10/2024 | Barber | B66F 13/00 | |

* cited by examiner

*Primary Examiner* — Diem M Tran
(74) *Attorney, Agent, or Firm* — Antonio Papageorgiou, Esq; Lombard Geliebter LLP

(57) ABSTRACT

The concrete removal device and system which can be used for fast, efficient removal of concrete sidewalks, driveways, slabs and other concrete constructions. A concrete removal device and system includes an operator capable of drilling a concrete slab to set an anchor bolt and driving a forklift equipped with a concrete removal device to elevate a concrete slab to deposit it in a dump truck or dumpster for hauling away from the removal site.

20 Claims, 9 Drawing Sheets

CONCRETE REMOVAL DEVICE AND SYSTEM

RELATED APPLICATION

This application claims the benefit of U.S. (Provisional) Application No. 63/401,815 filed Aug. 29, 2022 which is hereby incorporated herein by reference.

BACKGROUND OF THE INVENTION

The present application relates devices for removal of concrete sidewalks, driveways, slabs, and other concrete constructions.

The removal of concrete sidewalks, driveways, slabs, and other concrete construction can be an enormous task, requiring extensive labor. For example, such a task may require the use of jackhammers, wrecking balls, or other devices to break up the concrete. Front end loaders or other heavy equipment are thereafter needed to scoop up the broken concrete debris for loading into dump trucks that subsequently haul away the broken up concrete. Even a small job may therefore require skilled labor for at least a day.

Accordingly, there is a need for a concrete removal device and system which can be used for fast, efficient removal of concrete sidewalks, driveways, slabs, and other concrete constructions.

SUMMARY OF THE INVENTION

An apparatus is provided that includes: an angle having a vertical wall and a horizontal wall; and a plurality of gussets each attached to the vertical wall and the horizontal wall of the angle, along a length thereof. The vertical wall has a plurality of slots passing therethrough, each configured to receive a forklift fork, where the horizontal wall has a slot therein located between the holes in the vertical wall, and where the slot in the horizontal wall extends outward from about a center of the horizontal wall to an outer edge thereof.

In one embodiment, the apparatus further includes a pair of channels attached to the vertical wall and the horizontal wall at the slots in the vertical wall, the channels configured for forklift forks to pass through the slots and through a volume created by the channels and the horizontal wall of the angle.

In one embodiment, each of the channels is located on the angle between a pair of gussets.

In one embodiment, the slot in the horizontal wall is located on the angle between a pair of gussets.

In one embodiment, a thickness of the horizontal wall of the angle between the pair of gussets flanking the slot in the horizontal wall is a multiple of a thickness of the horizontal wall between other pairs of gussets.

In one embodiment, at least one of the channels has therein a means for securing the device to at least one forklift fork.

In one embodiment, the angle has a length of between 18 inches and 48 inches.

In one embodiment, the horizontal wall has a second slot therein located between the holes in the vertical wall, and wherein the second slot in the horizontal wall extends outward from about a center of the horizontal wall to an outer end thereof.

In one embodiment, each of the slot in the horizontal wall and the second slot in the horizontal wall are flacked by a pair of gussets.

In one embodiment, the slot in the horizontal wall flares out toward the outer edge of the horizontal wall.

Additional aspects of the present invention will be apparent in view of the description which follows.

BRIEF DESCRIPTION OF THE FIGURES

The invention(s) disclosed herein may be more completely understood in consideration of the following detailed description of various embodiments of the invention in connection with the accompanying drawings, in which.

Figure 1:
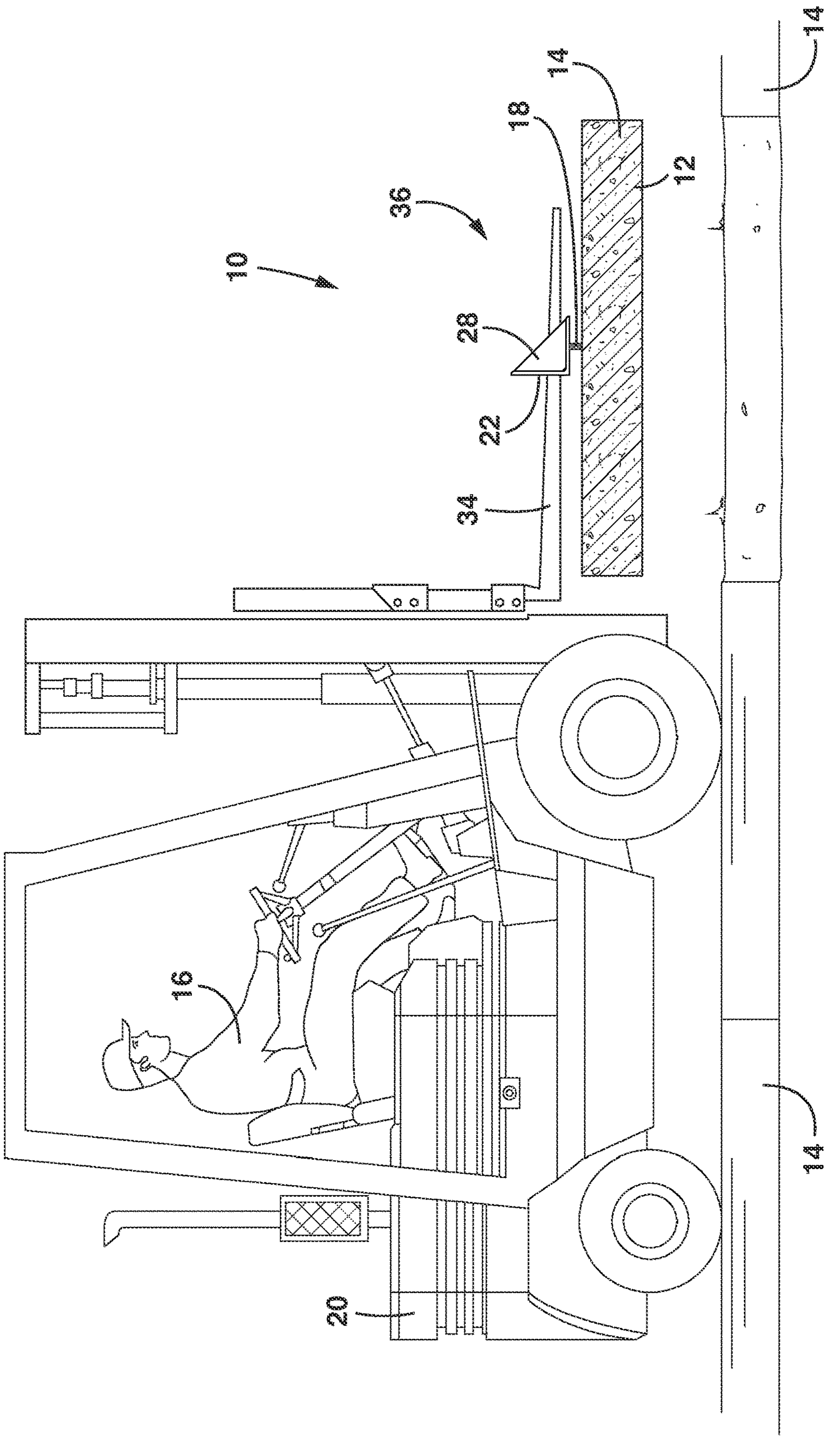
FIG. 1 is a side elevation view of the concrete removal device and system in use.

While the invention is amenable to various modifications and alternative forms, specifics thereof have been shown by way of example in the drawings and will be described in detail. It should be understood, however, that the intention is not to limit the invention to the particular embodiments described but rather to include all modifications, equivalents, and alternatives.

DETAILED DESCRIPTION OF THE INVENTION

Referring to FIG. 1 through FIG. 13, a concrete removal device and system 10 is provided which can be used for fast, efficient removal of concrete sidewalks, driveways, slabs 12, and other concrete constructions 14, which eliminates the need to break up the slab for removal. A concrete removal device and system 10, according to one embodiment, is used by an operator 16 capable of drilling a concrete slab 12 to set preferably a single anchor bolt 18 therein and driving a forklift 20 equipped with a concrete removal device 10 (such as unit shown in FIGS. 2-8) so that at least one forklift fork 34 slides into and through a channel extending through the device so that the forklift 20 can be used to elevate a concrete slab 12 (as shown in FIG. 1) above the ground surface and to deposit it in a dump truck or dumpster (without having to break the slab into smaller pieces), for hauling away from the removal site. At least one embodiment is described in the following descriptions. Of course, other embodiments can also be construed and constructed without departing from the inventive concepts disclosed herein.

Figure 2:
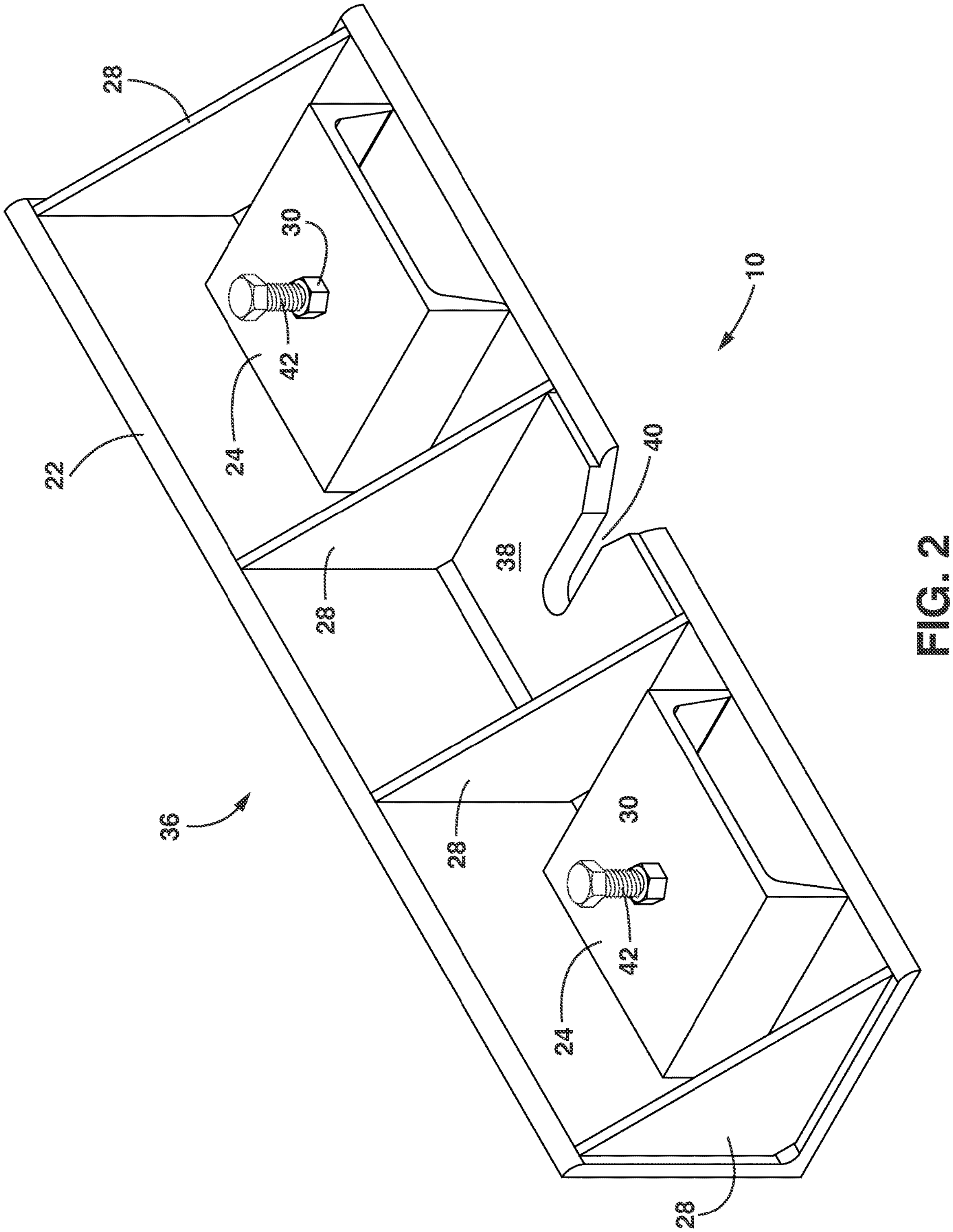
FIG. 2 is a perspective view of a concrete removal device.
Figure 3:
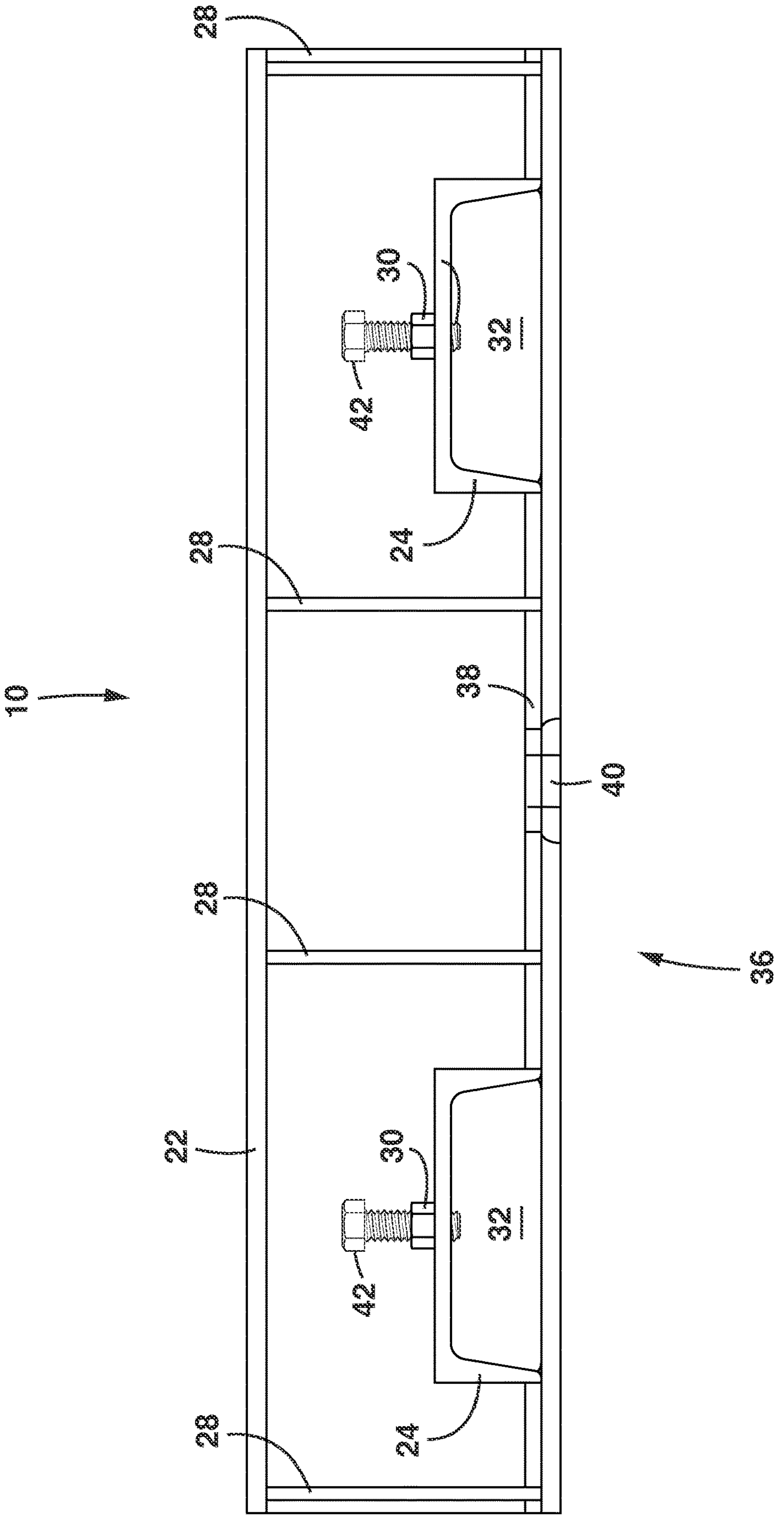
FIG. 3 is a front elevation view thereof.

The concrete removal device 10 as referenced in FIG. 1 through FIG. 10 is preferably made of ASTM A 36 grade steel and from a 4-8 inch, or preferably 6 inch by 4-8 inch, or preferably 6 inch by 0.3125 or 0.375 inch angle iron 22 about 24 inches long, or between about 18 inches to about 48 inches in other embodiments. Angle iron 22 may include one or more slots 32 cut in the vertical wall of the angle iron 22 to receive the forklift fork(s) 34, as shown in FIG. 3. One or preferably two channels, such as a C6×10.5 C channel(s) 24 may be fixedly attached to the vertical and horizontal walls of the angle iron 22, as shown, to reinforce the holes 32. Channels 24 may be about 5.25 inches in length along with one or more reinforcement plates 38 measuring about 5.75 inches by 4.875 inches by 0.25 inches thick. These components are welded together with 0.25 inch continuous straight and uniform fillet welds. All joints are welded as access is available.

In addition to the above. Four triangular gussets 28 preferably made from about 5.25 inch by 5.25 inch by 0.25 inch thick 1018 CRS steel, may be affixed to each of the walls of the angle iron 22 to add rigidity thereto angle iron 22. In one embodiment, the channels each have a through hole therein in the web of the channel. Two ½-20 UNF or 1-8 UNF steel hex nuts 30 as well as the gussets 28 may then, along with these components, be welded into the assembly with 0.25 inch continuous straight and uniform fillet welds. That is, a pair of gussets 28 are attached to the angle iron 22 so that the channel 24 sits between the gussets 28. Moreover, the hex nut 30 is welded above the through hole in the channel so that bolt 42 can pass therethrough so that the device 10 may be secured to the forklift forks 35. All joints are welded as access is available.

Figure 4:
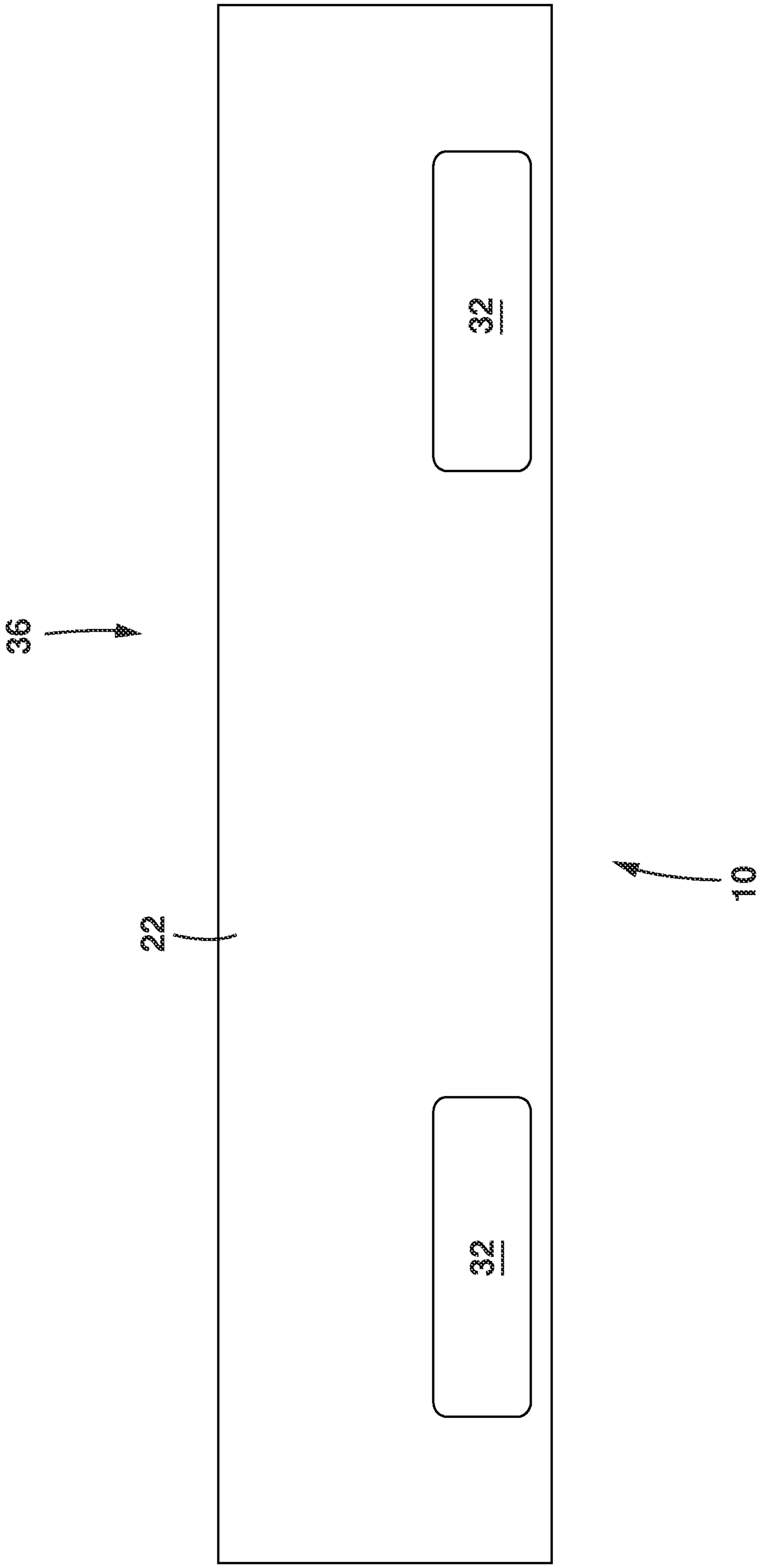
FIG. 4 is a rear elevation view thereof.
Figure 6:
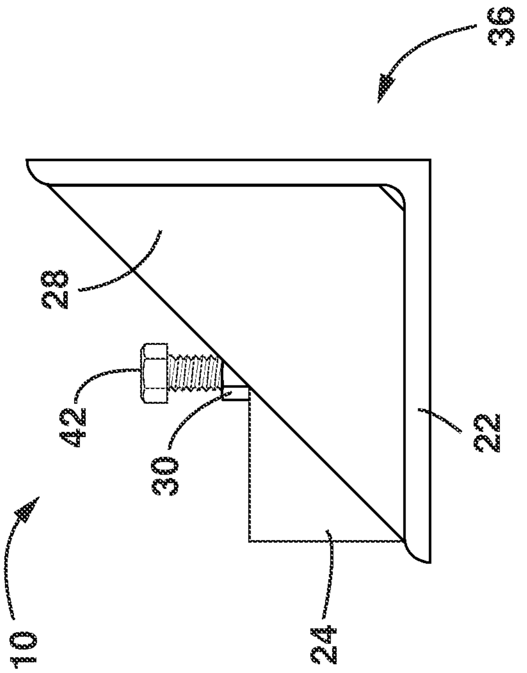
FIG. 6 is a right side elevation view thereof.
Figure 5:
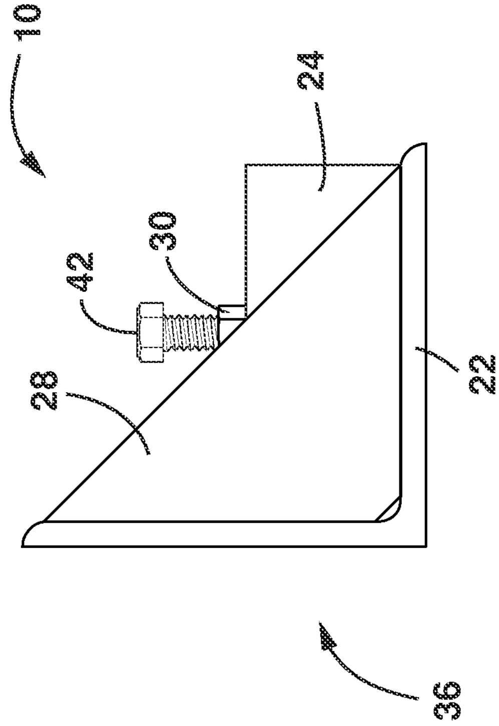
FIG. 5 is a left side elevation view thereof.
Figure 7:
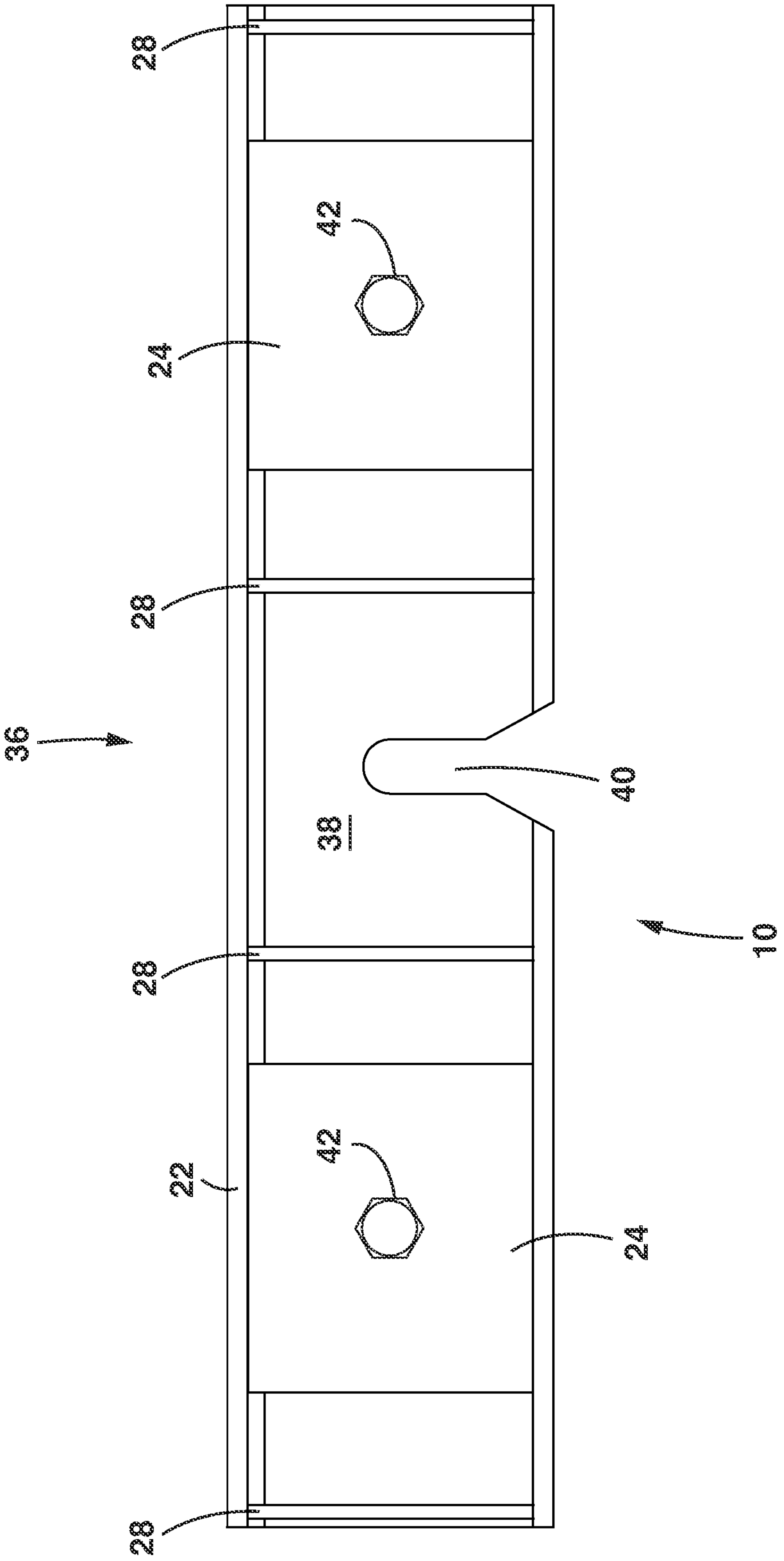
FIG. 7 is a top plan view thereof.
Figure 8:
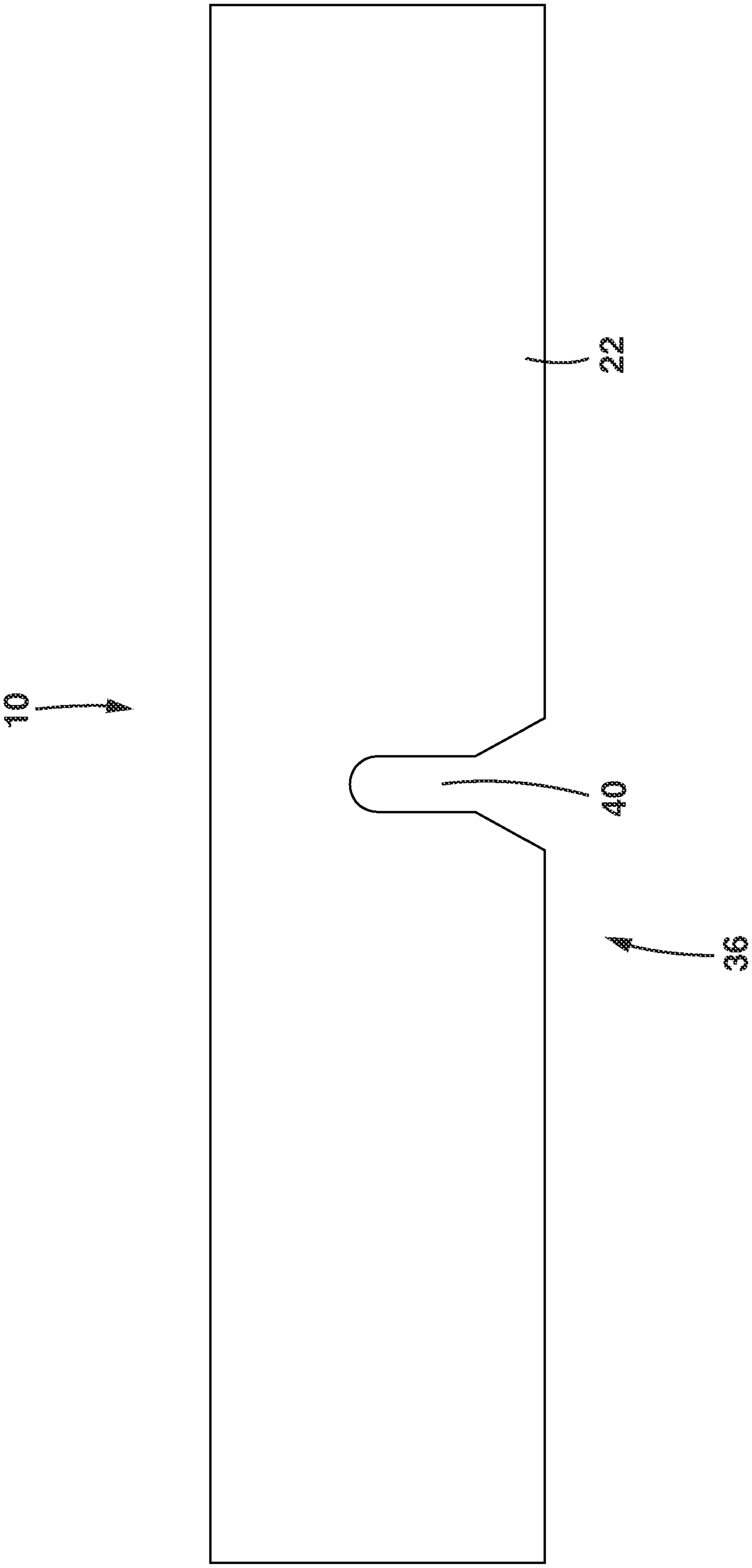
FIG. 8 is a bottom plan view thereof.

The vertical wall of the angle iron 22 preferably has two holes 32 cut out about 1.75 inches by 5.75 as shown in FIG. 4. The holes 32 accommodating the entry of forklift forks 34 from the rear face and through the channels 24 of the concrete removal device 10.

Figure 9:
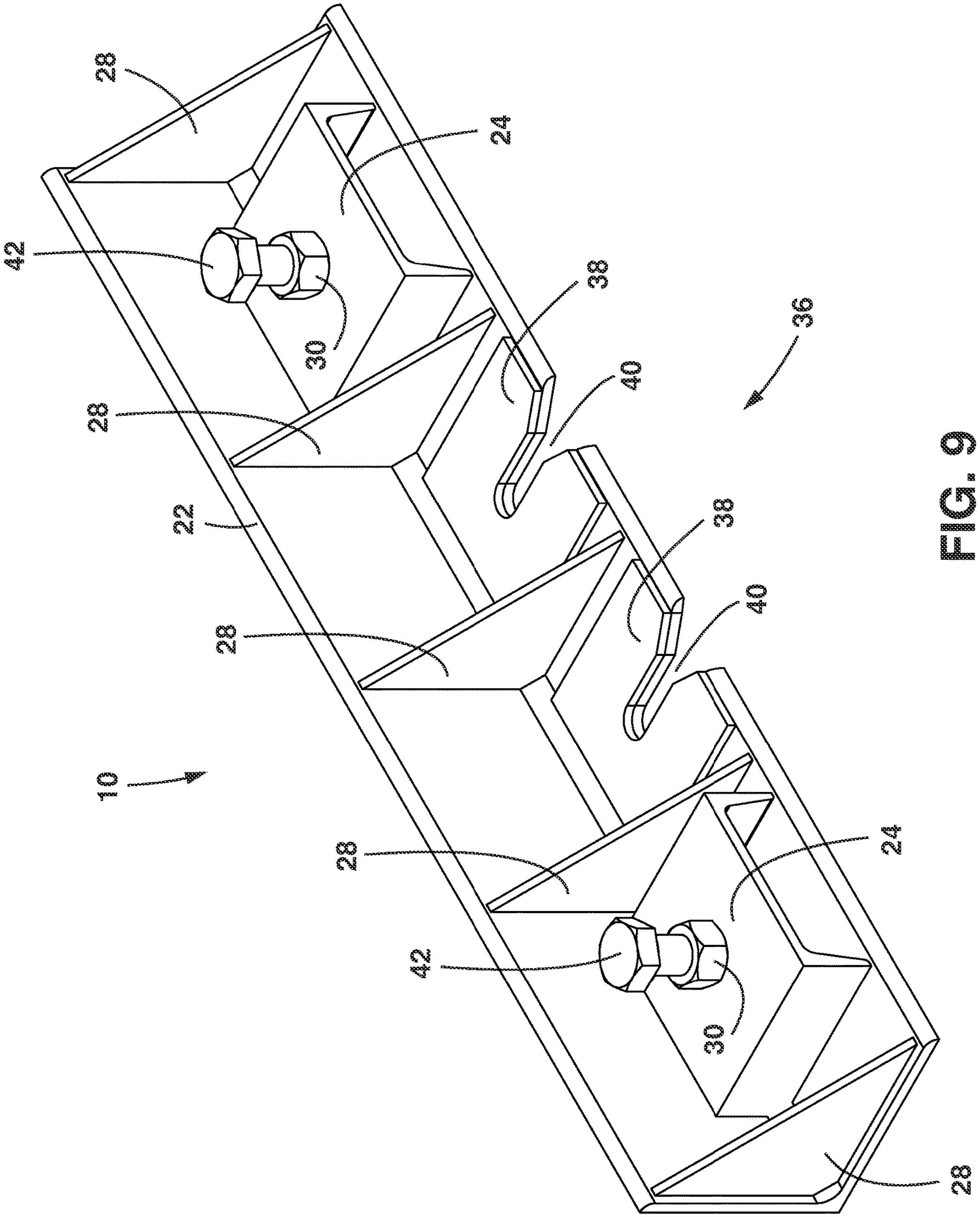
FIG. 9 is a perspective view of a second embodiment of a concrete removal device and system.
Figure 10:
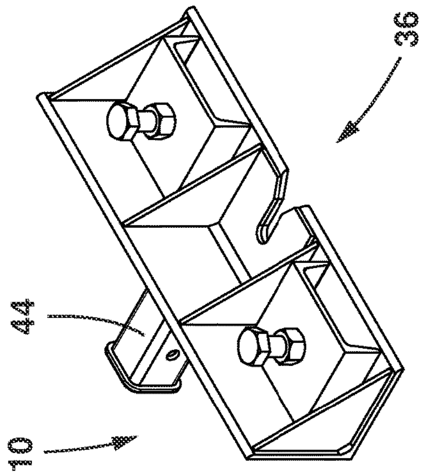
FIG. 10 is a perspective view of a third embodiment of a concrete removal device.
Figure 11:
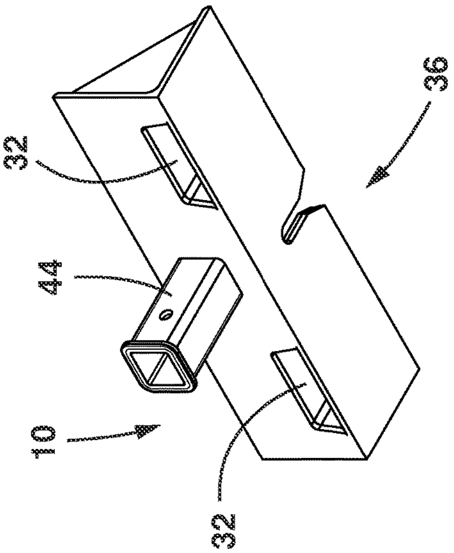
FIG. 11 is a perspective view of FIG. 10 looking up from the bottom.
Figure 12:
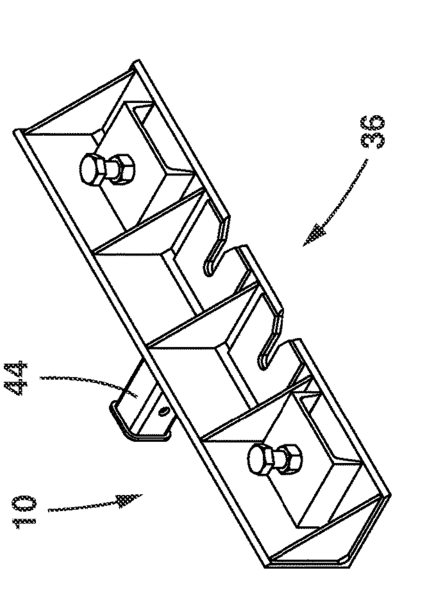
FIG. 12 is a perspective view of a fourth embodiment of a concrete removal device.
Figure 13:
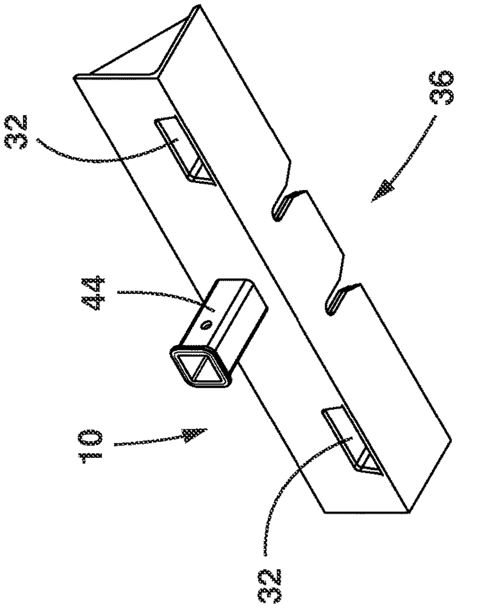
FIG. 13 is a perspective view of FIG. 12 looking up from the bottom.

The central portion of the assembly 36, between the middle gussets 28, has a slot 40 therein extending from about the middle of the horizontal wall of the angle iron 22 through to the outer edge thereof. Preferably, slot 40 flares out about ⅓ of the way from the outer edge of the horizontal wall. Preferably, a reinforcement plate 38 is positioned between the middle gussets, such that the thickness of the horizontal wall of the angle iron 22 is a multiple of the thickness of the wall between the channels. The keyhole like open slot 40 cut extends through both the reinforcement plate 38 and the angle iron 22, as shown in FIG. 2. The slot according to a preferred embodiment measures about 2.375 inches at the front and is about 1 inch wide through the body by about 3.5 inches long, as shown in the drawings. As shown in FIG. 9, the device 10 may be configured with a plurality of outward slots 40 having essentially the same dimensions and being, essentially parallel to each other, each between a pair of gussets 28.

In other embodiments, concrete removal device and system 10 can have a receiver 44 attached to the rear face of the angle iron 22, opposite the slot 40, as shown in FIGS. 10-13, for accommodating a variety of hitches, which receiver 44 may be attached by a continuous welded joint or other means. The receiver 44 is preferably made from ASTM A 36 grade steel tube about 0.25 inches thick with about a 2.125 inch×2.125 inch inside dimension and about 6 inches in length. A receiver 44 can have a lip plate measuring about 1.875 inches×1.875 inches×0.25 inches thick surrounding the front entrance point and about a 0.625 inch hole continuously through the tube, as an access hole for a hitch pin. In this embodiment, the device 10 may be affixed to the forklift from the direction of the slot 40, so that the receiver 44 faces outward from the forklift.

A concrete removal device 10 can be left unfinished or have a surface finish applied by plating, galvanizing, painting, or powder coating to name a few examples.

The device 10 may be used by a laborer by setting an anchor bolt 18, such as a large diameter Tapcon (LDT) Anchor, measuring about 0.625 inches by 4 inches in length, in the center of each concrete slab 12 to be lifted. The bottom of the head of the anchor bolt 18 is positioned about 1 inch above the top surface of the concrete slab 12.

The forklift operator 16 may then position the forks 34 into the holes through the angle iron 22 and slide the forklift forks 34 through the channels 24 of the concrete removal device 10, centering the device on the forks 34. A laborer may then tightens two hex head bolts 42 into the two ½-20 UNF steel hex nuts 30, therewith securing the concrete removal device 10 to the forklift forks 34. The operator 16 then drives the forklift 20, positioning the concrete removal device 10 so that the keyhole like slot 40 receives the shank of the anchor bolt 18. The head of the anchor bolt 18 protrudes above the concrete removal device 10.

As the forklift forks 34 are lifted upward by the operator 16, the concrete removal device 10 engages the underside of the anchor bolt 18 head, lifting the concrete slab 12 from the ground, so that the slab can be moved to a position where it can be dropped into a dump truck or dumpster to be hauled away from the removal site.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A concrete removal device, comprising:

an angle iron having a horizontal wall and a vertical wall, the angle iron configured to support the weight of a concrete slab during removal;

at least one channel fixedly attached to both the horizontal wall and the vertical wall of the angle iron, the at least one channel forming a passageway dimensioned to receive forklift forks and stabilize the device during lifting;

a first keyhole-like slot extending through the horizontal wall of the angle iron, the first keyhole-like slot configured to receive and engage a first anchor bolt embedded in the concrete slab, thereby enabling secure lifting of the concrete slab without segmenting the slab into smaller sections;

at least one reinforcement plate positioned between gussets attached to the angle iron, the at least one reinforcement plate reinforcing the horizontal wall adjacent to the first keyhole-like slot to prevent deformation during lifting;

whereby, upon engagement with a forklift, the concrete removal device facilitates lifting and transporting the concrete slab as a single, intact piece.

2. A concrete removal system for removing concrete slabs, comprising:

the concrete removal device of claim 1, the concrete removal device configured to be mounted on forks of a forklift;

a forklift having at least two forks, the at least two forks configured to slide through the at least one channel within the concrete removal device;

a first anchor bolt embedded in the concrete slab, the first anchor bolt having a shank dimensioned to engage with the first keyhole-like slot in the concrete removal device;

wherein the forklift forks engage the concrete removal device, allowing the concrete removal device to lift the concrete slab through engagement with the first anchor bolt and transport the concrete slab to a disposal site without fragmenting the concrete slab.

3. The concrete removal system of claim 2, wherein the forklift forks are secured within the concrete removal device by two hex head bolts tightened into steel hex nuts affixed to the channels, each bolt stabilizing the device during operation.

4. The concrete removal system of claim 2, wherein the concrete removal device comprises the first keyhole-like slot and the second keyhole-like slot, each slot configured to receive and engage a respective anchor bolt embedded in the concrete slab, thereby facilitating the lifting of a larger concrete slab as an intact piece.

5. The concrete removal device of claim 1, wherein the angle iron is constructed from ASTM A 36 grade steel with a thickness ranging from approximately 0.3125 inches to 0.375 inches, the material and thickness providing durability during repeated lifting operations.

6. The concrete removal device of claim 1, further comprising at least four triangular gussets affixed to the angle iron to enhance structural rigidity, each gusset reinforcing the connection between the horizontal and vertical walls of the angle iron.

7. The concrete removal device of claim 1, wherein the first keyhole-like slot includes a flared section extending from a middle portion of the horizontal wall to an outer edge of the horizontal wall, the flared section configured to facilitate secure engagement with the first anchor bolt.

8. The concrete removal device of claim 1, wherein the at least one reinforcement plate is welded between gussets attached to the angle iron with continuous fillet welds, reinforcing the area adjacent to the first keyhole-like slot and preventing deformation during lifting.

9. The concrete removal device of claim 1, further comprising a receiver affixed to a rear face of the angle iron, the receiver configured to accommodate various hitches, the receiver constructed from ASTM A 36 grade steel tubing.

10. The concrete removal device of claim 1, wherein the at least one channel comprises a C6×10.5 C channel fixedly attached to the angle iron with continuous fillet welds, the C channel extending approximately 5.25 inches and reinforcing the passageway for forklift forks.

11. The concrete removal device of claim 1, wherein the vertical wall of the angle iron has two spaced-apart holes, each hole dimensioned to receive one of the forklift forks, allowing for centered alignment on the forklift.

12. The concrete removal device of claim 1, wherein the horizontal wall of the angle iron further includes a second keyhole-like slot, the second keyhole-like slot configured to receive and engage a second anchor bolt embedded in the concrete slab.

13. The concrete removal device of claim 12, wherein the first keyhole-like slot and the second keyhole-like slot are positioned parallel to each other along the horizontal wall of the angle iron, each slot providing independent engagement with a respective anchor bolt.

14. The concrete removal device of claim 12, wherein each of the first and second keyhole-like slots extends from a middle portion of the horizontal wall to an outer edge of the horizontal wall, each keyhole-like slot dimensioned to engage a separate anchor bolt.

15. The concrete removal device of claim 12, further comprising two reinforcement plates, each positioned near a respective one of the first and second keyhole-like slots, the reinforcement plates reinforcing the horizontal wall of the angle iron around each keyhole-like slot.

16. The concrete removal device of claim 12, wherein each of the first and second keyhole-like slots has an outward flare extending from the middle portion of the horizontal wall toward the outer edge of the horizontal wall, enhancing engagement with each respective anchor bolt.

17. The concrete removal device of claim 1, further comprising an adjustable locking mechanism configured to secure the device at various positions along the forklift forks, the adjustable locking mechanism allowing precise positioning and preventing shifting during slab lifting and transport.

18. The concrete removal device of claim 1, wherein the device has a surface treatment selected from the group consisting of plating, galvanizing, painting, and powder coating, the surface treatment applied to prevent corrosion and enhance durability under outdoor operating conditions.

19. The concrete removal device of claim 1, wherein the angle iron, reinforcement plates, and gussets are modularly connected to allow for disassembly and replacement of individual components, thereby facilitating maintenance and prolonging the operational lifespan of the device.

20. A method of removing a concrete slab, comprising:

(a) drilling an anchor bolt into the concrete slab;

(b) positioning a concrete removal device on forks of a forklift, the concrete removal device having at least one keyhole-like slot configured to accommodate the anchor bolt;

(c) aligning the forklift forks through at least one channel in the concrete removal device and securing the concrete removal device to the forklift forks;

(d) positioning the concrete removal device over the anchor bolt so that the keyhole-like slot receives the anchor bolt;

(e) lifting the concrete slab in a single piece using the forklift, transporting the concrete slab to a disposal location.

* * * * *